(12) United States Patent
Barner et al.

(10) Patent No.: US 12,717,886 B1
(45) Date of Patent: Aug. 25, 2026

(54) AUTHENTICATION METHOD AND SYSTEM FOR PERSONS WITH VISUAL IMPAIRMENTS

(71) Applicant: UIPCO, LLC, San Antonio, TX (US)

(72) Inventors: Robert Wilson Barner, San Antonio, TX (US); Oscar Guerra, San Antonio, TX (US); Justin Dax Haslam, San Antonio, TX (US); Quian Antony Jones, San Antonio, TX (US); Qunying Kou, San Antonio, TX (US); Kristina Suniga-Cabrera, San Antonio, TX (US); Shabana Thahseen, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 27 days.

(21) Appl. No.: 18/931,613

(22) Filed: Oct. 30, 2024

Related U.S. Application Data

(60) Provisional application No. 63/594,721, filed on Oct. 31, 2023.

(51) Int. Cl.
*G06F 21/32* (2013.01)
*G06F 21/62* (2013.01)

(52) U.S. Cl.
CPC .......... *G06F 21/32* (2013.01); *G06F 21/6209* (2013.01); *G06F 2221/2141* (2013.01)

(58) Field of Classification Search
None
See application file for complete search history.

(56) References Cited

U.S. PATENT DOCUMENTS

2017/0293747 A1* 10/2017 Naqvi ................ G06F 21/6218

FOREIGN PATENT DOCUMENTS

| | | | | |
|---|---|---|---|---|
| CN | 113221024 A | * | 8/2021 | G06Q 10/047 |
| KR | 20180110764 A | * | 10/2018 | G06Q 50/22 |
| KR | 20240082442 A | * | 6/2024 | G06F 21/32 |
| KR | 20240101242 A | * | 7/2024 | G16H 10/60 |

* cited by examiner

*Primary Examiner* — Nelson S. Giddins
(74) *Attorney, Agent, or Firm* — Plumsea Law Group, LLC

(57) ABSTRACT

A method and system of performing an authentication of an identity of a person with visual impairments. The system and method are configured to cause a wearable secondary computing device worn by a guide dog accompanying the person to generate a verification signal. This verification signal can be evaluated to determine whether the verification signal is authentic and/or includes an expected biometric data feature. If the verification signal is deemed to be authentic, the system can verify an identity of the person, and can further be configured to automatically grant the person access to one or more services, features, or information for which the person is authorized.

20 Claims, 10 Drawing Sheets

AUTHENTICATION METHOD AND SYSTEM FOR PERSONS WITH VISUAL IMPAIRMENTS

CROSS-REFERENCE TO RELATED APPLICATION

This application claims the benefit of U.S. Provisional Patent Application Ser. No. 63/594,721 filed on Oct. 31, 2023 and titled "Authentication Method and System for Persons with Visual Impairments", the disclosure of which is incorporated by reference herein in its entirety.

TECHNICAL FIELD

The present disclosure generally relates to identity authentication, and specifically to a method and system for authentication of persons with visual impairment seeking access to one or more secured services, features, and resources. The authentication is based on the collection of data via a computing device worn by a guide dog that accompanies the user who is visually impaired.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. This is especially true in cases where the end-user has a visual impairment, and may struggle with conventional authentication requirements. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an identity of a user accompanied by a guide dog in order to protect user resources is disclosed. The method includes a first step of receiving, at an authentication system, first biometric data for the guide dog. The authentication system may be a remote cloud-based server in some embodiments. The method also includes a second step of linking, at the authentication system, a first reference record created based on the first biometric data to a first user identity that is associated with the user. A third step includes receiving from a first person, at the authentication system and via a first computing device, a request to access a secured resource of the user. Furthermore, a fourth step includes receiving, at the authentication system, second biometric data for the guide dog obtained while the first person was physically within a first range of the guide dog. A fifth step includes determining, at the authentication system, that the first reference record matches the second biometric data, and a sixth step includes determining, at the authentication system, in response to the first reference record matching the second biometric data, that the first person has the first user identity. In addition, a seventh step includes authenticating, in response to determining the first person has the first user identity, the first person, and an eighth step includes generating, at the authentication system, an access signal that grants the first person access to the secured resource.

In another aspect, a method for verifying an identity of a user accompanied by a guide dog is disclosed. The method includes a first step of receiving from a first person, at the authentication system and via a first computing device, a request to access a secured resource associated with a first user identity. A second step includes receiving, at the authentication system, a verification signal from a secondary device worn by the guide dog, the verification signal obtained while the first person was physically within a first range of the guide dog. In addition, a third step includes determining, at the authentication system, that the verification signal is authentic, and a fourth step includes determining, at the authentication system, in response to the verification signal being authentic, that the first person has the first user identity. A fifth step includes authenticating, in response to determining the first person has the first user identity, the first person, and a sixth step includes generating, at the authentication system, an access signal that grants the first person access to the secured resource.

In another aspect, a system for verifying an identity of a user accompanied by a guide dog includes a processor and machine-readable media. The machine-readable media include instructions which, when executed by the processor, cause the processor to: (1) receive, at an authentication system, first biometric data for the guide dog; (2) link, at the authentication system, a first reference record created based on the first biometric data to a first user identity that is associated with the user; (3) receive from a first person, at the authentication system and via a first computing device, a request to access a secured resource of the user; (4) receive, at the authentication system, second biometric data for the guide dog obtained while the first person was physically within a first range of the guide dog; (5) determine, at the authentication system, that the first reference record matches the second biometric data; (6) determine, at the authentication system, in response to the first reference record matching the second biometric data, that the first person has the first user identity; (7) authenticate, in response to determining the first person has the first user identity, the first person; and (8) generate, at the authentication system, an access signal that grants the first person access to the secured resource.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
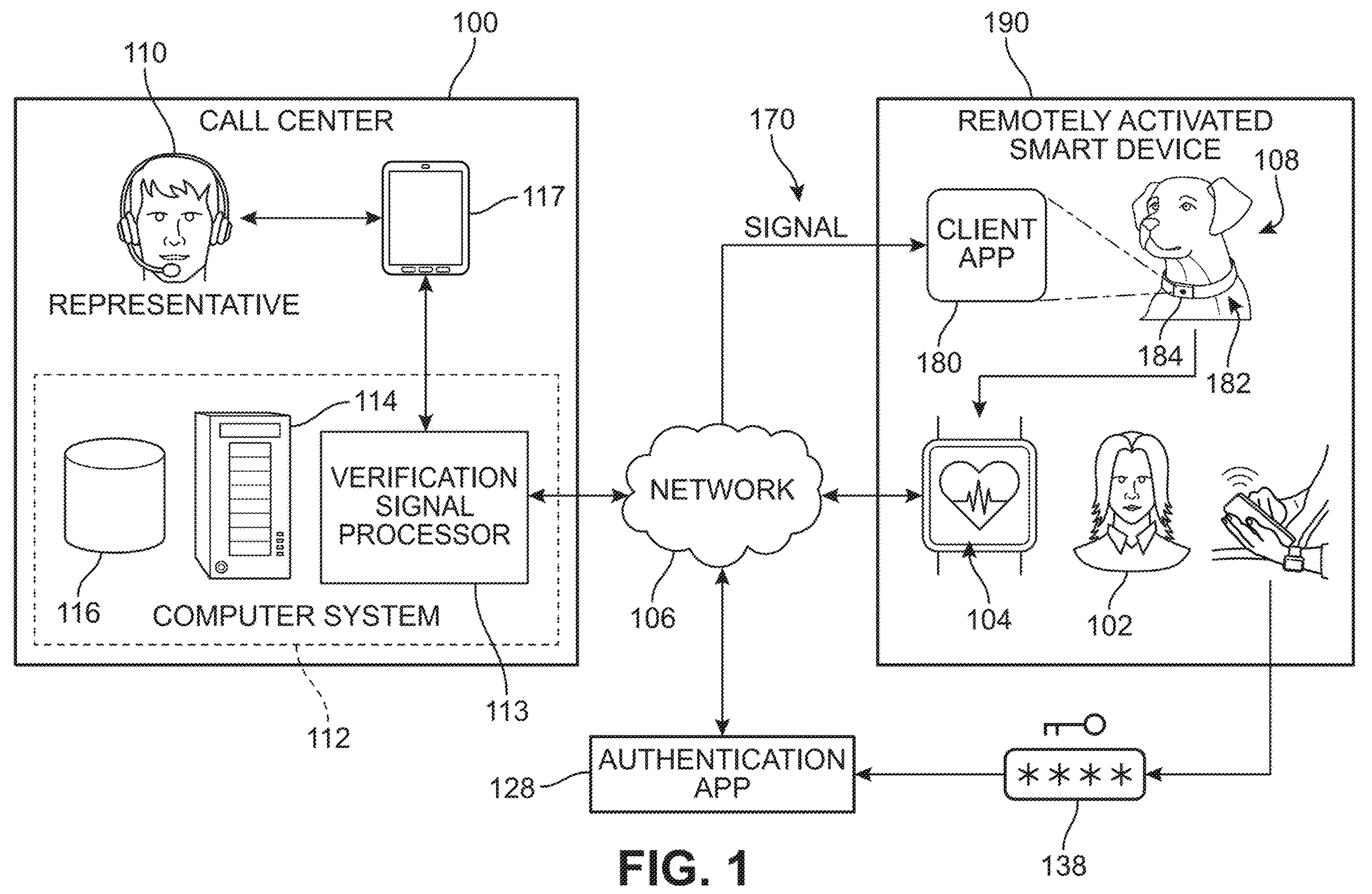
FIG. 1 is an overview of a scenario in which a person requests access to a secured resource and a secondary device worn by a guide dog generates a verification signal, according to an embodiment.

The embodiments provide a method and system of authenticating blind or visually impaired persons in a more secure and efficient manner using remote signaling of user devices as part of a specialized two-factor authentication (2FA) process. In some embodiments, the proposed methods and systems offer blind users—who are often confronted with situations requiring reading when logging into their account, and can find traditional two factor authentication methods inconvenient or difficult to use—an alternate mechanism by which to verify their identity. More specifically, for blind persons with guide dogs or seeing eye dogs, the proposed 2FA system can collect the unique biometric characteristics of the guide dog as a second factor during authentication.

As described in greater detail below, an authentication process and system based on data obtained via a remotely triggered smart device installed on the guide dog's collar may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of network sensors with computing devices in the day-to-day life of the modern consumer. More specifically, the system contemplates a blind user requesting access to a secured resource via a first computing device ("primary device") which includes a specialized authentication application ("authentication app"). In different embodiments, in response to a request for access via the primary device, the authentication app generates a remote signal to cause a customized dog collar or harness ("secondary device") worn by the guide dog to transmit a signal back to the authentication app. In one example, the harness can include onboard sensors that can acquire one or more unique biometric characteristics of the guide dog over time, such as but not limited to the guide dog's heart rate. In some embodiments, the recorded heart rate may be converted into a numerical code or waveform at the secondary device. The harness would also include wireless communications capabilities and a processor for preparing and communicating the data to the primary device. This process can occur, for example, during a video session with a customer representative who represents a gatekeeping system for the secured resource. In some other cases, the representative may manually initiate the transmission of the trigger signal, rather than the authentication app.

In different embodiments, such an approach can be advantageous in combating the growing threat of video forgery and other criminal activity related to identity theft. For example, deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a blind user's identity with minimal user effort and offer a simplified, efficient, and ultimately highly convenient process by which to authorize and grant the user access to secured resources. Such systems can rely on a secondary device that is typically always in proximity to or within reach of the blind user, while at the same time providing an entirely separate and irreproducible set of data that cannot be readily stolen or mimicked, making it simple to deploy at a low cost yet offer great security value.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body (e.g., adjusting the position of their arm) from one location to another are passive interactions, as the person would perform these activities regardless of the authentication system that is in place. However, other user actions, such as but not limited to providing a passcode, security question answers, etc. are active inputs and a system requiring any of these types of information would not be considered passive. In addition, this type of arrangement—relying on wearable secondary devices—precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

For purposes of introduction, an overview of one embodiment of the proposed systems and methods is illustrated with reference to FIG. 1. In FIG. 1, an example of an authentication process is shown in which a first user 102, in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

For purposes of this example embodiment, customer service call center 100 includes at least one computer system 112. The term "computer system" refers to the computing resources of a single computer, the partial computing resources of a single computer, a plurality of computers communicating with one another, or a network of remote servers. In one embodiment, computer system 112 includes at least one server having at least one processor. The server can include an authentication system by which the proposed embodiments may be implemented (e.g., see FIG. 2B). In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory and can include records of biometric data for the guide dog that are linked to the user's account. In an example embodiment, computer system 112 may also include or be configured with access to an authentication system (see FIGS. 2A and 2B), of which a secondary device verification signal processor module ("verification signal processor") 113 is a component. In some embodiments, verification signal processor 113 may be implemented in software, hardware, or a combination thereof.

In some embodiments, first user 102 may have access to a secondary user computing device ("secondary device") 182 that is incorporated into a collar or harness worn by a guide dog 108 that accompanies the first user 102, who is visually impaired. In one embodiment, secondary device 182 is a mobile device, for example, a smart device, or other wearable or portable smart computing device that can receive signals over a network including but not limited to smart apparel and other smart wearable accessories. In addition, the user requesting access can make use of a primary computing device ("primary device") 118 through which the communication session occurs. The primary device 118 can include a tablet, a laptop, a smartphone, a desktop computer, or similar kind of device that allows first user 102 to contact call center 100. For example, the first user 102 can be speaking and listening to the representative 110 via a desktop computer. In FIG. 1, the primary device 118 is a mobile phone. For purposes of this example, the first customer 102 has just been connected to representative 110 and is seeking access to their account details.

In different embodiments, the secondary device 182 and/or primary device 118 can include an electronics unit comprising a plurality of different components, such as one or more of various user interface components (e.g., a touch-screen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The secondary device 182 and/or primary device 118 may be configured to receive and analyze data from various input sensors associated the device or data that is communicated from external components or devices to the device. In some cases, the secondary device 182 and/or primary device 118 may also include a navigation system equipped with a GPS receiver that can receive GPS information or other receivers capable of receiving global or local positioning information.

A communication module may allow the secondary device 182 and/or primary device 118 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the secondary device 182 and/or primary device 118 may include a device display ("display") that can, for example, present information and various media for a product/service support software application ("authentication app") 128. In other embodiments, as discussed below, the secondary device 182 can include a physiological collection sensor 184 that allows the secondary device 182 to detect the heartrate or other physiological data (also referred to as biometric data) from the guide dog 108. In other embodiments, the secondary device 182 could alternatively generate a unique code or signal that would be used to verify the user's identity. Whether physiological or logic-based, this data is then used to produce a verification signal 104 that could be received over a network 106 (e.g., internet, Bluetooth®, etc.) at either or both of the primary device 128 (e.g., via authentication app 128) and computing system 112 as a second authentication factor (e.g., in addition to a user-provided first authentication factor 138, such as a passcode, token, or user biometric data, among other factor types).

In different embodiments, the authentication app 128 can be associated with the provider of the product/service for which the service representative 110 is offering support. In some embodiments, the first user 102 can receive and send information through a user interface that may be presented on a display for the primary device 118. In some embodiments, the display may be a touchscreen, allowing the customer to interact with the user interface directly by touch. The user interface may refer to an operating system user interface or the interface of one or more software applications that may run on the either or both of the primary device 118 and/or secondary device 182 (shown as a client app 180 in FIG. 1). In some embodiments, the user interface can include a messaging window or other chat-space by which the service representative 110 may share messages or other digital content. Alternatively, in some embodiments, the first user 102 can also speak with the service representative via a voice calling application on primary device 118, or directly through a telephone or other external device.

In different embodiments, while the first user 102 is communicating with representative 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

In some embodiments, representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, send documents and forms to a customer, provide access to a secured resource, and/or perform other tasks required to help a customer calling in to call center 100.

In some embodiments, representative device 117 may include computer systems for processing and communicating information. The device may generally include a processor, a data storage component, and a display. Representative device 117 may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, primary device 118 and/or secondary device 182 could operate in a client-server relationship with one or more servers of computer system 112. For example, computer system 112 may include a server that communicates with secondary device 182, primary device 118, as well as other remote devices (e.g., user devices of other customers) over a network 106. The primary device 118 and/or secondary device 182 may provide the front-end of a system that provides users with options for performing various kinds of tasks (for example, making fund transfers when the company is a bank). In some cases, primary device 118 and/or secondary device 182 may run client software 180 through a web browser, in which case the client software may be hosted on a server associated with computer system 112. In other cases, secondary device 182 and/or primary device 118 may run client software in the form of a native software application that has been downloaded through a centralized marketplace (i.e., an "app store"). In some cases, while the client software that allows users to perform various tasks may be run on primary device 118 or secondary device 182, the data may be retrieved from and stored on databases associated with computer system 112 (e.g., databases 116).

In this example, during the call between representative 110 and first user 102, the first user 102 is requesting access to an account or other secured resource associated with the first user. In response, in different embodiments, a remote access management system associated with the computer system 112 can automatically, or at the manual request of the service representative, initiate an authentication procedure, action, or task that includes a remote signaling event. As a general matter, a remote signaling event refers to the process and period during which the authentication system, either via the computer system 112 or the primary device 118, issues a control signal 170 to a remote user device over network 106, where the control signal 170 causes the secondary device 182 to generate the verification signal 104.

In other words, in some embodiments, as depicted in FIG. 1, as an end-user with a visual impairment is conducting a transaction that requires two-factor authentication, the authentication app 128 (running on the primary device 118) can automatically initiate an interaction with the guide dog's harness (secondary device 182) to receive the required verification signal 104 that would complete two-factor authentication. In some embodiments, authentication app 128 could communicate with the dog's harness-device (secondary device 182) and request the second factor of the two-factor authentication from the secondary device 182. In one example, the secondary device 182 could respond with verification signal 104 that comprises a general indication of approval, and/or the numerical code representing the guide dog's heart rate or the biometric waveform. This information from the guide dog's harness would be used by the authentication app 128 as the second factor of the 2FA. Thus, with such a system, unauthorized users that would attempt to access the user's account would be locked out because the authentication app would not be able to communicate with the guide dog's harness or collar.

In different embodiments, the access management authentication system associated with or running on computing system 112 can then determine, based on the received verification signal 104 and the submitted first authentication factor 138, whether to authenticate the user for access to the secured resource. For example, the verification signal processor 113 can process and analyze the incoming verification signal 104 and determine whether the verification signal 104 includes a depiction or representation of the biometric pattern or other authentication factor that was previously recorded and stored in computing system 112. If the expected pattern is detected in the verification signal 104, the authenticity of the end-user (e.g., their video or image, or their app access) can be verified, providing an additional layer of veracity to the user's identity. In this example, verification signal 104 includes a representation of the dog's heartbeat that sufficiently similar to the stored heartbeat record so as to be deemed a match, and the system automatically communicates this information to the service representative and/or automatically enables access to the secured resource for the end-user. Thus, in FIG. 1, without further action or presentation of credentials by first user 102, the communication/access session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the data provided by the secondary device 182 worn by the guide dog 108.

Figure 2A:
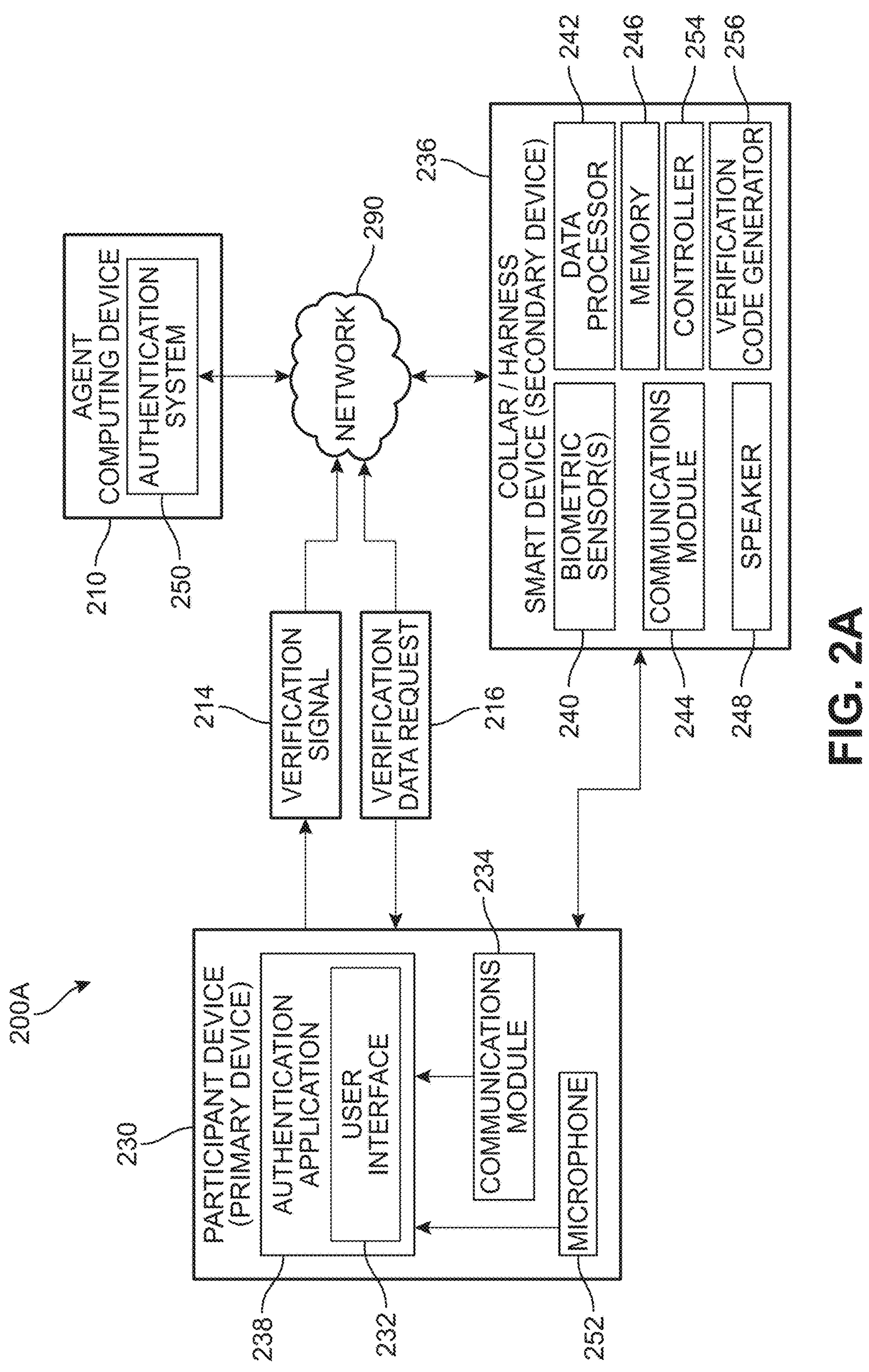
FIGS. 2A and 2B are collectively an overview of an environment of an access management authentication system, according to an embodiment.
Figure 2B:
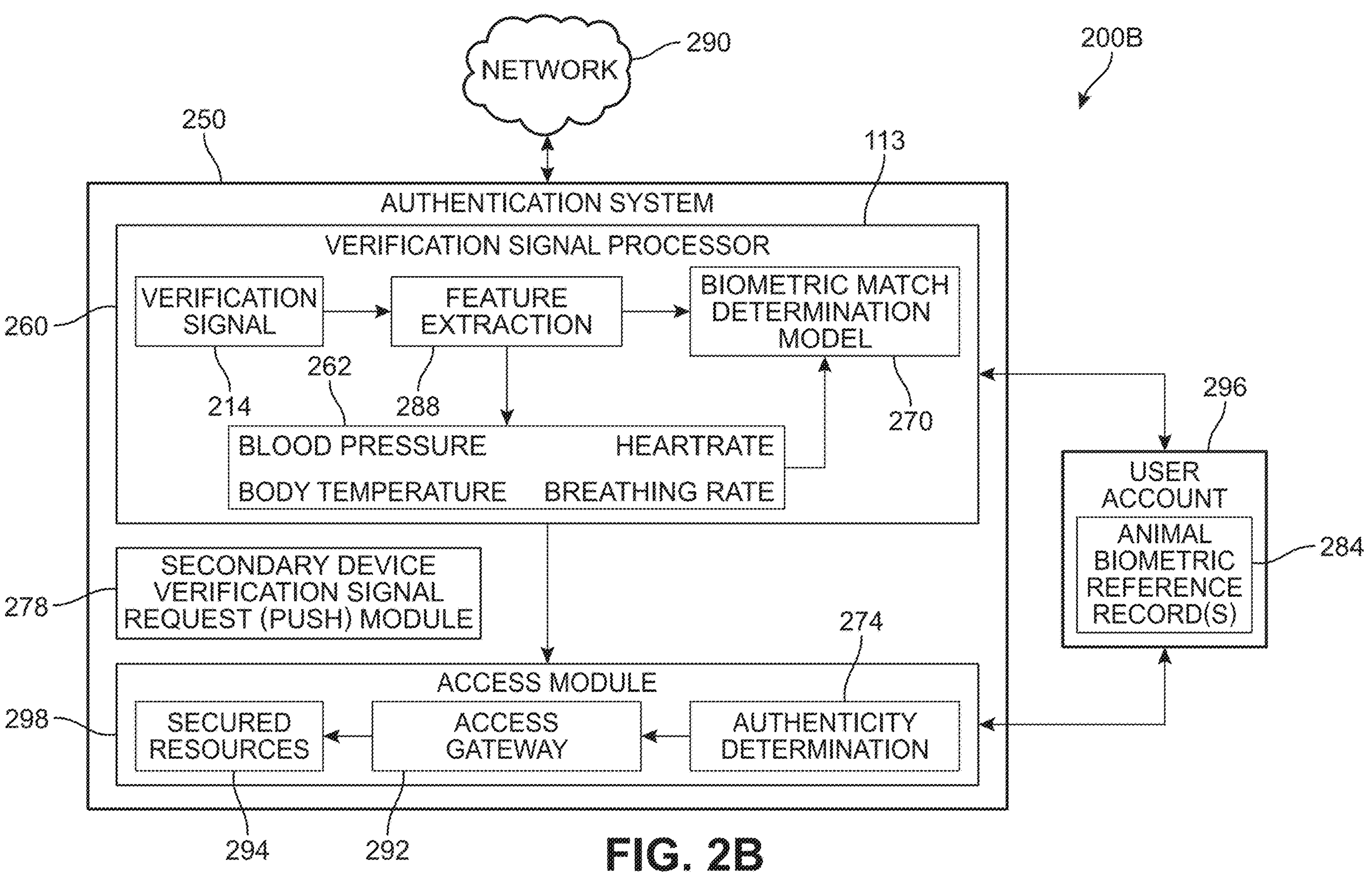

In order to provide the reader with a greater appreciation of the embodiments, FIGS. 2A and 2B depict an overview of an embodiment of an environment 200A and 200B of an access management authentication system architecture in which guide dog worn device data is obtained and used to determine an authenticity of an accompanying end-user. The two drawings are separated for purposes of clarity, such that the two drawings represent a single diagram. It should be understood that the environment (200A, 200B), collectively referred to as environment 200, is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIGS. 2A and 2B.

As shown in FIG. 2A, the environment 200 includes a participant computing device ("participant device") 230 that is configured to communicate with an agent computing device ("agent device") 210 or other gatekeeping computing device for access to a secured resource, for example via a Wi-Fi, cellular, or other network connections 290. The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries. While the various components of environment 200 are shown as being accessed through a cloud network and/or stored on a cloud-based server in FIGS. 2A and 2B, in other embodiments some or all components or modules described herein can reside in participant device 230 and/or agent computing device 210.

In different embodiments, the participant device 230 includes a device display ("display") that can present information and media for a product/service, for example via a videoconferencing-chat messaging or other communication application that can connect the participant with the support agent and/or enable access to a secured resource. This interaction can be managed via authentication app ("app") 238. In some embodiments, the authentication app 238 includes or is part of the communication application. Thus, for purposes of this embodiment, reference to the authentication app 238 can also include a communication service, component, or app that is used by the user to communicate with a remote service agent. For example, a customer can receive and send information through a user interface 232 that may be presented on the device display. The user interface 232 can present media for the communication app that works in conjunction with the authentication app. Although the app 238 is shown as residing on participant device 230 in FIG. 2A, it should be understood that the app 238 can be a web-based application that is accessed from the device via network 290.

The user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the user launches the app 238 on participant device 230, they may be shown an option to initiate a screen sharing function, whereby content currently being displayed on the participant device 230 is transmitted to the agent computing device 210, or a videoconferencing functionality. In some embodiments, the user interface 232 can include a messaging window or other chat-space by which the support agent may send text messages or other digital content. Alternatively, in some embodiments, the customer can also speak with the support agent via a voice calling application on participant device 230, or directly through a telephone or other external device, such as a cell phone or more general videoconferencing system.

Thus, as a general matter, agent device 210, participant device 230, and authentication system 250 (e.g., see FIG. 2B) can be configured to work in conjunction with the telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet-based meetings (e.g., WebEx™), custom call-center systems, and other conference call systems. In addition, app 238 can be configured to present various interfaces by which administrator or other users can interact with features of the system 250. In some embodiments, the app 238 running on participant device 230 can include additional components enabling features by which control signals received from the authentication system may be executed. In other embodiments, the components can be configured as a simple software execution mechanism which receives, translates, and presents output in response to signals transmitted by the authentication system. In other embodiments, the app 238 is unnecessary, and the features described herein can be performed completely by the authentication system 250 based on data received directly over network 290 from the secondary device 236.

Although not shown in FIG. 2A, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agent can refer to any person or personnel who offers the caller (or person who was called) assistance, and has access to features of the authentication system 250 during the communication session with the customer.

As noted above, during the communication session between the participant and the agent, control signals (e.g., verification data request 216) may be transmitted from the authentication system that cause a controller 254 for secondary device 236 worn by the guide dog to produce a specific type of data. In some embodiments, a secondary device component, such as one or more onboard biometric sensors ("sensors") 240 and/or a verification signal generator 256, can be used to provide the requested data (verification signal 214). In different embodiments, the sensors 240 can include a device that can collect data from the dog's physical body or its systems, such as but not limited to one or more of the guide dog's heart rate, blood glucose, blood pressure, respiration rate, body temperature, blood volume, sound pressure, photoplethysmography, electroencephalogram, electrocardiogram, blood oxygen saturation, and skin conductance. More specifically, sensors 240 can be incorporated into the collar or harness worn by the dog, and or be connected by wires or wirelessly to locations on the dog's body, employing skin patches, scalp, skin/chest electrodes, pulse oximeters, mounted sensor devices, etc. It can be appreciated that the collection of biometric data can provide an additional layer of security as then even if the wearable secondary device is stolen or lost, it cannot be used to produce the required verification signal without the presence of the guide dog as well. In other words, the use of biometric data requires that the secondary device actually be worn by the individual guide dog (not just 'any dog').

Thus, the sensors 240 can acquire a wide variety of biometric data. In some embodiments, an onboard data processor 242 can then convert the biometric data to a code, pattern, or other value that can be transmitted by onboard communication module 256 as the verification signal 214 to the authentication system 250. This transfer of data can be routed either via the authentication app 238 of participant device 230 to the authentication system 250, or directly from the secondary device 236 to the authentication system 250. In some embodiments, the biometric data can be stored in memory 254 at the secondary device 236 for a period of time until authentication is completed. In still another example, the verification signal 214 can be generated as audio via a speaker 248 that is recorded by a microphone 252 at the participant device 230. The verification signal 214 can, in different embodiments, be transmitted via communications module 234 to the authentication system 250 over network 290.

Alternatively or additionally, in some embodiments, the control signals (e.g., verification data request 216) may be transmitted from the authentication system 250 and cause the controller 254 for secondary device 236 worn by the guide dog to produce a unique or user-linked code via the verification signal generator 256, which can then serve as the requested data (verification signal 214). This code can then be evaluated by the authentication system 250 (see FIG. 2B) to determine whether the 2FA has been successfully performed.

Referring now to FIG. 2B, in different embodiments, authentication system ("system") 250 is configured to receive a user request for access to secured resources 294 associated with a user account. The user account can be registered in a user accounts database 296 that is accessible by the authentication system 250. As noted earlier, in different embodiments, components of the environment 200 such as the system 250, agent device, secondary device, and/or participant device may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

In some embodiments, the system 250 is capable of communicating with external devices such as agent device (also referred to herein as an administrator computer) and the participant device through the network 290 using wired or wireless communication capabilities. The system 250 can be understood to comprise a cloud-based server and, along with the agent device, may include computing devices comprising any number of components, such as a Network Interface Card (NIC), allowing the respective devices to receive, transmit, process, and store information obtained from the image capture devices. In other words, the system 250 may include groups or subgroups of computing devices that can communicate with each other, but not necessarily with the computing devices in other groups or subgroups. The system 250 may include computing devices of disparate types, having different types of hardware and software configurations and in a variety of different locations. In some cases, multiple devices or subsystems can be identified together as a single computing device.

In different embodiments, the system 250 includes or is configured to access one or more databases, such as member data repository or user accounts database 296, in order to enable access to secured resources 294 only to authorized users. The user accounts database 296 can include a content library that stores account data related to one or more users. The data may include, for a plurality of users, name, personal and professional details, current and past policy information for the user, credit limit of users, among other details. The user accounts database 296 can further include connection information for known (registered) user primary and secondary devices for which the user has authorized and enabled the input and execution of a control signal. In one embodiment, the registry maintains a listing of one or more computing devices for each end-user subscribed to the guide dog-based verification signal mechanism. In different embodiments, the database 296 therefore includes a protocol providing communication with the app running on the user's devices and/or the controller included in their secondary devices. It can be understood that the end-user has also provided consent to the system for remote access and control of each of these registered devices as appropriate for authentication purposes.

As will be discussed further below, an animal biometric reference record(s) repository 284 associated with accounts database 296 can store one or more reference record(s) that include one or more features that may be used for verification purposes. During enrollment to the authentication service (e.g., see FIG. 3), a secondary device worn by the user's guide dog can collect biometric data that will be recorded and stored for later use by the authentication system 250 as a reference record. In different embodiments, the reference record is not the raw biometric data but instead a value or code that was created by processing and conversion of the original biometric data. In some embodiments, each biometric signal that is registered by the user during enrollment can be stored in the database and represent or be included in an authentication record that will be linked to the account of the person (including identification data) who participated in the training session, and be made available for use by the system during subsequent authentication sessions. In some embodiments, one or more models may be generated based on the training/reference data that has been collected.

At a later time (after enrollment), responsive to a request for access to a secured resource, the authentication system 250 can request (e.g., via a secondary device verification signal request module 278 of the verification signal processor 113) that the secondary device provide a verification signal. Once the signal is created, the system 250 can receive the verification signal 214 at a verification assessment module 260 of the verification signal processor 113. In different embodiments, a feature extraction module 288 can then prepare and/or parse the signal to isolate the components related to the veracity of the user. In cases where biometric data has been collected and not converted to a value at the dog's wearable device, feature extraction can isolate and extract one or more biometric data types 262 (e.g., blood pressure, body temperature, heartrate, breathing rate, etc.) and their characteristic patterns, depending on the sensor data that was provided. This data is then shared with a biometric match determination module 270, which can determine whether the biometric data is acceptable or sufficient, and then perform a scoring process that compares the received data with the available reference data in the database 296. The scoring process is analogous to "what is the probability that the biometric data patterns captured by the secondary device are the same as the verification reference record patterns stored in the database 296 for the same guide dog?" Thus, in some embodiments, the determination of a "match" is not necessarily based on the verification/reference sample directly or exactly matching the content of the reference record, but rather on the two samples being substantially similar or sharing particular features. The returned score is evaluated against a threshold value to determine if it meets or exceeds the minimum acceptable score by an authenticity determination module 274 for an access module 298 of the system 250. If the score is determined to be successful, an access gateway 292 can automatically allow a user to proceed further within a call center or telephone banking menu system or other secured resources 294 being safeguarded by the service provider, or the output can be presented to the service agent who can manually release access to the secured resources 294.

In other embodiments, the verification signal can include a converted biometric code, as described above, and the authenticity determination module 274 can simply determine whether the code matches the expected input in order to determine that authenticity has been successfully performed and the access gateway 292 should allow access to the secured resources 298. Furthermore, in some embodiments, the verification signal 214 can instead include a specific code or audio data that is produced by the secondary device and then evaluated by the authenticity determination module 274. Again, the authenticity determination module 274 can then determine whether the code matches the expected input in order to determine that authenticity has been successfully performed and the access gateway 292 should allow access to the secured resources 298.

Thus, in different embodiments, the authenticity determination module 274 of the access module 298 can receive the verification signal 214 and/or a match determination score from the verification signal processor 113 and make a decision regarding whether to authenticate the user. The access gateway 292 receives the authentication decision, and if the decision is positive and the user's identity has been verified, the access gateway 292 enables access to secured resources 294. In some embodiments, the verification signal can serve as an authentication factor that can trigger one or more of the following responses in a computing device that is managing the security of the secured resource: (a) enable the user to access their account information; (b) enable the user to access cash/funds from their bank account (e.g., via an ATM), or release cash from the dispenser of the ATM; (c) approving/unblocking the processing of the payment for the requested purchase (e.g., at a POS terminal); (d) enable access to a physical location through a secured/locked door by automatically unlocking the door, or automatically unlocking a compartment in which valuables/secured items are stored, (e) enable access to the secured electronic contents in a digital storage locker; and (f) present an approval message to a third party indicating the user has been authenticated. In other words, in different embodiments, the authentication system can generate an authentication signal that is received by another computing system that manages access to the secured resource and is configured to respond to such an authentication signal by triggering or causing an access-granting event to a secured resource.

Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the second computing device or account address for the registered user. It can be appreciated that authentication based on verification of the user's possession (or accompaniment) of data produced via secondary device strongly implies that the user's identity is true and correspondingly is in fact entitled to whatever access is being requested. It should be understood that while the system 250 bases access decisions at least in part on the detection of the biometric data and/or other specific designated code/pattern, in some embodiments, the system is further configured to first confirm that the user ID and optional password match based on information available in the user accounts database 296.

Although not shown in FIG. 2A or FIG. 2B, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device can be connected to or include an internet customer interface for providing support specifically to customers or members who contact them via the Internet. As a general matter, support agents or service representatives can refer to any person or personnel who offers the caller (or person who was called) assistance, and has access to the system 250 during the communication session with the customer.

Figure 3:
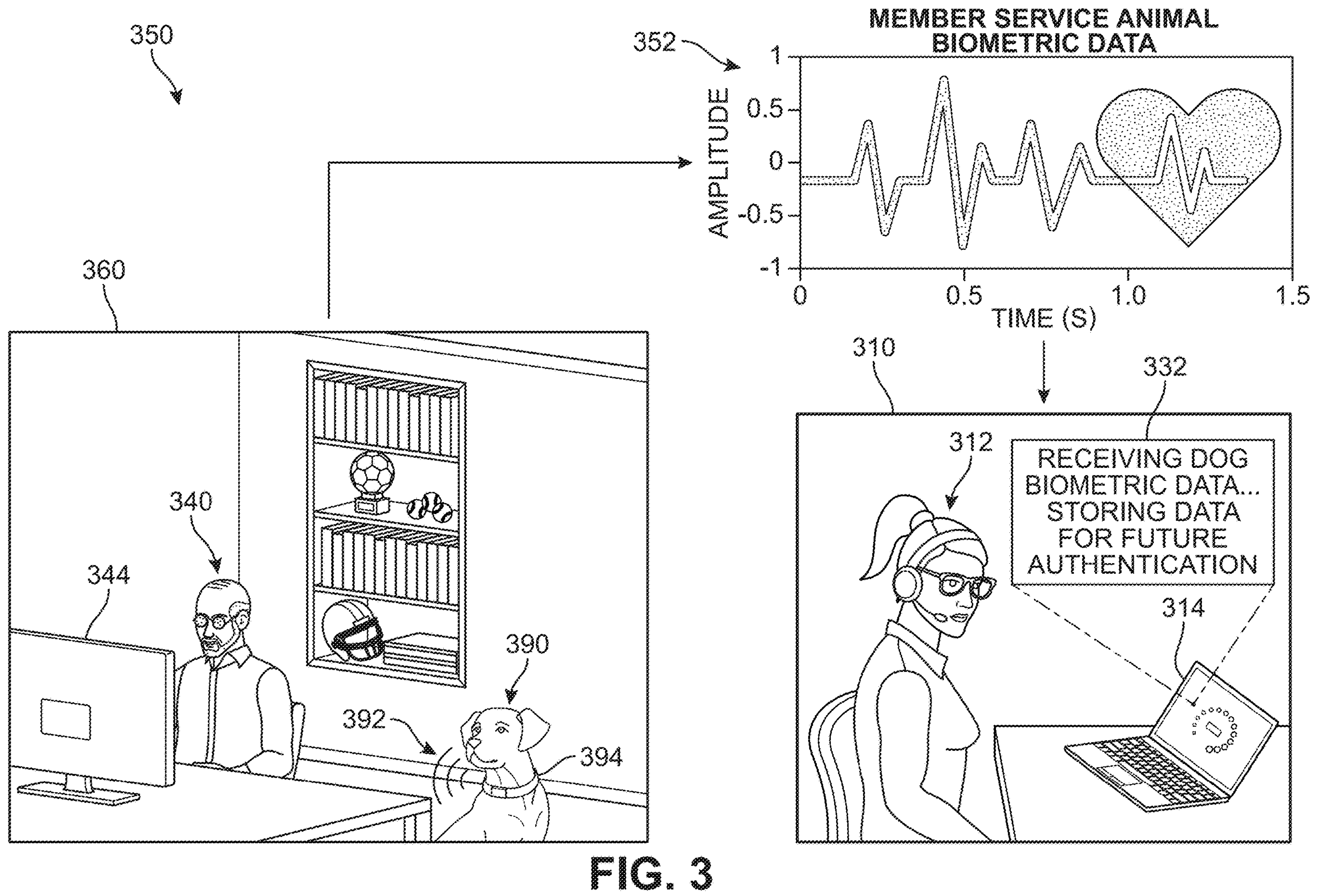
FIG. 3 depicts an example of a user enrolling their guide dog's biometric data with the authentication system for future use, according to an embodiment.

Referring now to FIG. 3, an example of an enrollment or training and record acquisition session ("enrollment session") 350 for collection of biometric data that may be used by some of the proposed systems is depicted. The training session 350 can, in some embodiments, be used to collect data and identify features that are physiologically characteristic to the guide dog and will then be stored in a database. In this case, a second user 340 is located in a physical space 360 which is a home office of a residence. It should be understood that physical space 360 can comprise any other type of space where the user resides or works or otherwise frequents, including other rooms of his or her home, meeting rooms at his or her workplace, or even a library, vehicle, outdoor space, or other place of business. In other words, the collection of the data can occur anywhere, as long as there is confidence that guide dog 390 will be in a substantially similar physical state or condition (i.e., not involved in a strenuous or anxiety-inducing activity during data collection).

In FIG. 3, the second user 340 is, via a first computing device ("first device") 344, interacting with the access management authentication system and communicating with a first agent 312. The first agent 312 is interacting with the second user 340 via their second computing device ("second device") 314 that is located at a remote site 310. The second user 340 has requested and/or been offered the opportunity to register a biofeedback token (reference record) with his account, and is in the process of enrolling himself by providing a sample of the biometric data for guide dog 390. In different embodiments, a user can communicate via an interface generated by an application provided by access management authentication system. The application can offer a user interface that may be accessed via any user computing device configured for connection to a network. In different embodiments, the application can be configured to offer content via native controls presented via an interface.

Furthermore, in some embodiments, the communication occurs in part or fully via a video conferencing interface whereby the first agent 312 and second user 340, via a camera device connected to their respective computing devices, speak in real-time over a video screen. Once the second user 340 provides his consent to the enrollment session, a control signal is generated that causes a dog collar smart device ("smart collar") 394 to transmit, over a network 392, a reference signal 352 comprising characteristics of their biometric data. In different embodiments, this reference signal 352 is received by the authentication app running on the first device 344, which further conveys the reference signal 352 to the remote authentication system associated with the second device 314, as depicted by a status message 332 at the second device 314. As discussed above, in some embodiments, the reference record that is created based on this reference signal can include feature sets that will serve as a reference for subsequent authentication sessions. While an agent is shown as being part of the enrollment process in FIG. 3, it should be understood that the enrollment process can also be performed with the second user 340 automatically by the system.

While only one enrollment sequence is shown here, it can be appreciated that in different embodiments, a user may opt to register multiple reference records. For example, they may have one reference record saved for their dog's heartrate, another for their dog's blood pressure reading, and still another for the dog's breathing rate. In addition, in different embodiments, the user may opt to provide reference data updates at different intervals. For example, the user may need to change their guide dog or experience some other change that may affect the validity of the reference record stored, and therefore may request to submit new reference data. In other cases, the merchant or other authentication entity may require or recommend that participants provide new reference data twice a year, once a month, or at other less or more frequent intervals to ensure the reference record that is stored is up-to-date. In one embodiment, the reference record can be associated with an expiration date or period of time after which the participant will be required to provide new (current) biometric data for their animal.

In some embodiments, an account for the customer verifying their identification credentials can also be linked to the customer's reference record at or around that time. Thus, a verification process may occur in conjunction with the collection of the initial biometric data, whereby the participant presents identity documents that can be used to confirm the user's identity. The user identity can then be linked to the biometric data in the record. In some embodiments, the reference record and/or account can be further linked to the customer's credit and/or payment details that can facilitate or even automate various retail merchandise transaction processes. In addition, in some embodiments, the record or user account may identify an authorization type or level that the customer is to be granted. For example, the customer may be authorized to access only some portion of the secured resource, depending on the reference record that is presented to the system. This can allow the user to, for example, access some resources while traveling, and the full array of resources when in a more secure location such as their own home.

Figure 4:
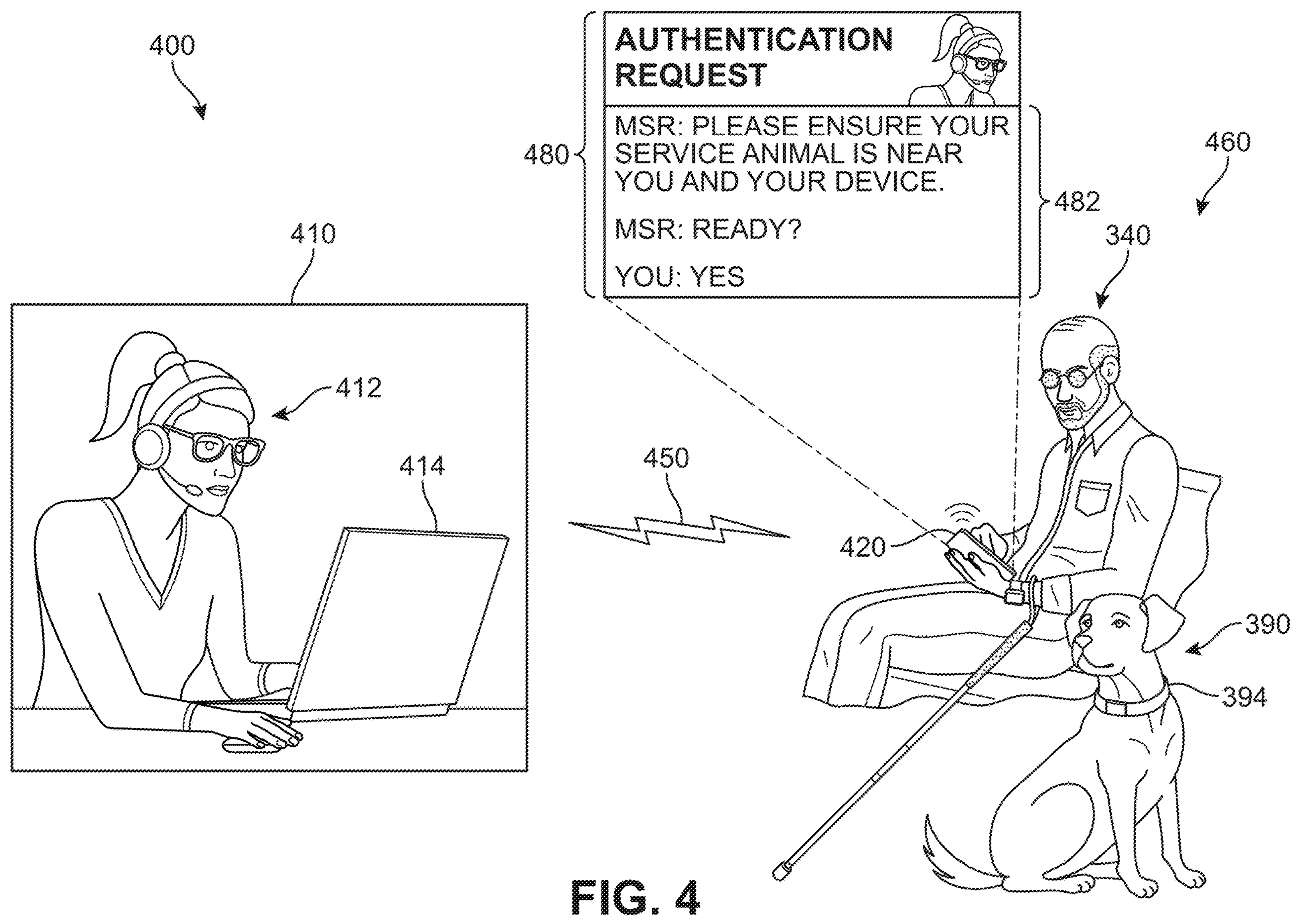
FIGS. 4, 5, and 6 depict an example of a sequence in which a request for access is received and the authentication system triggers a remote biometric data capture event by the secondary device worn by the guide dog, according to an embodiment.
Figure 5:
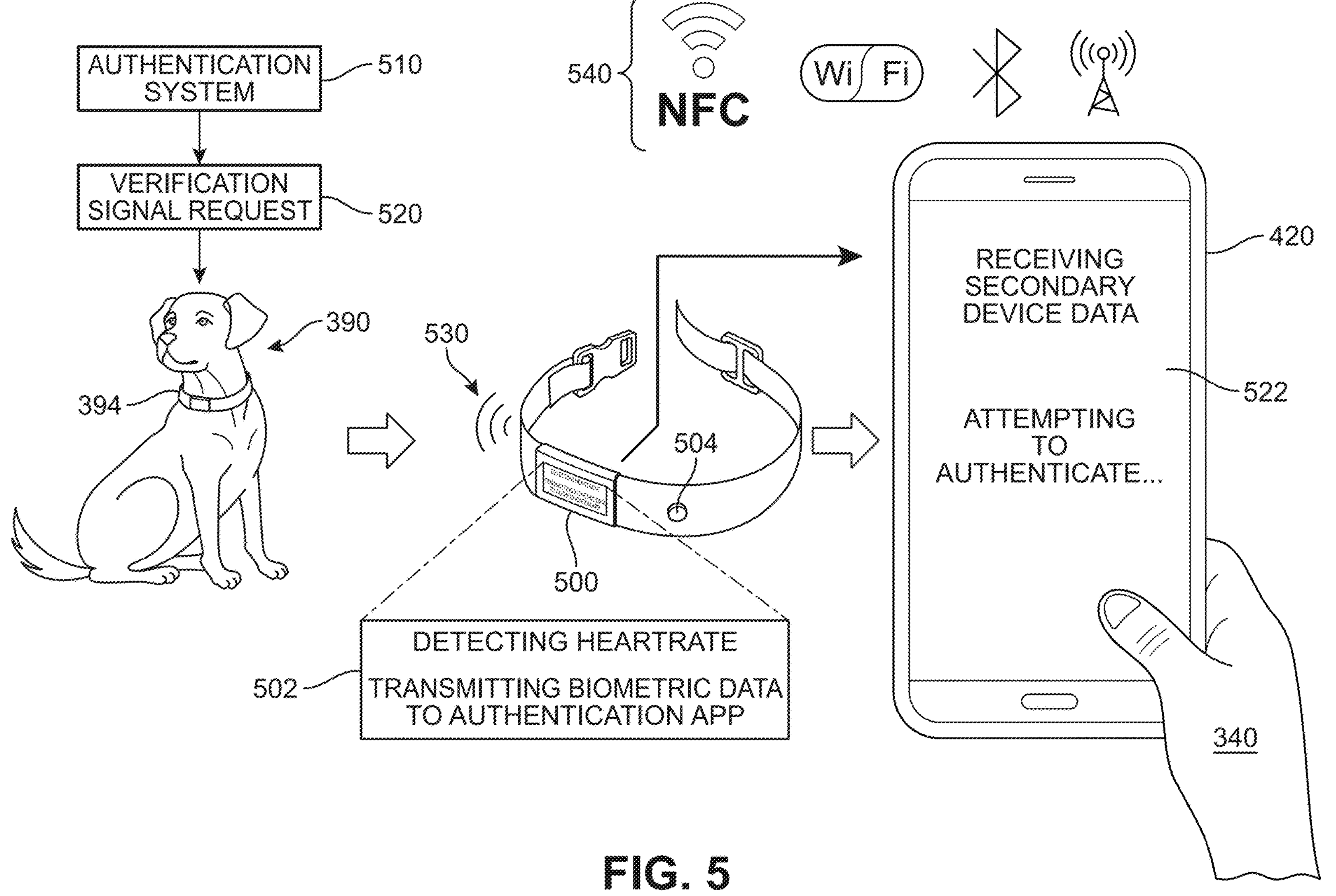
Figure 6:
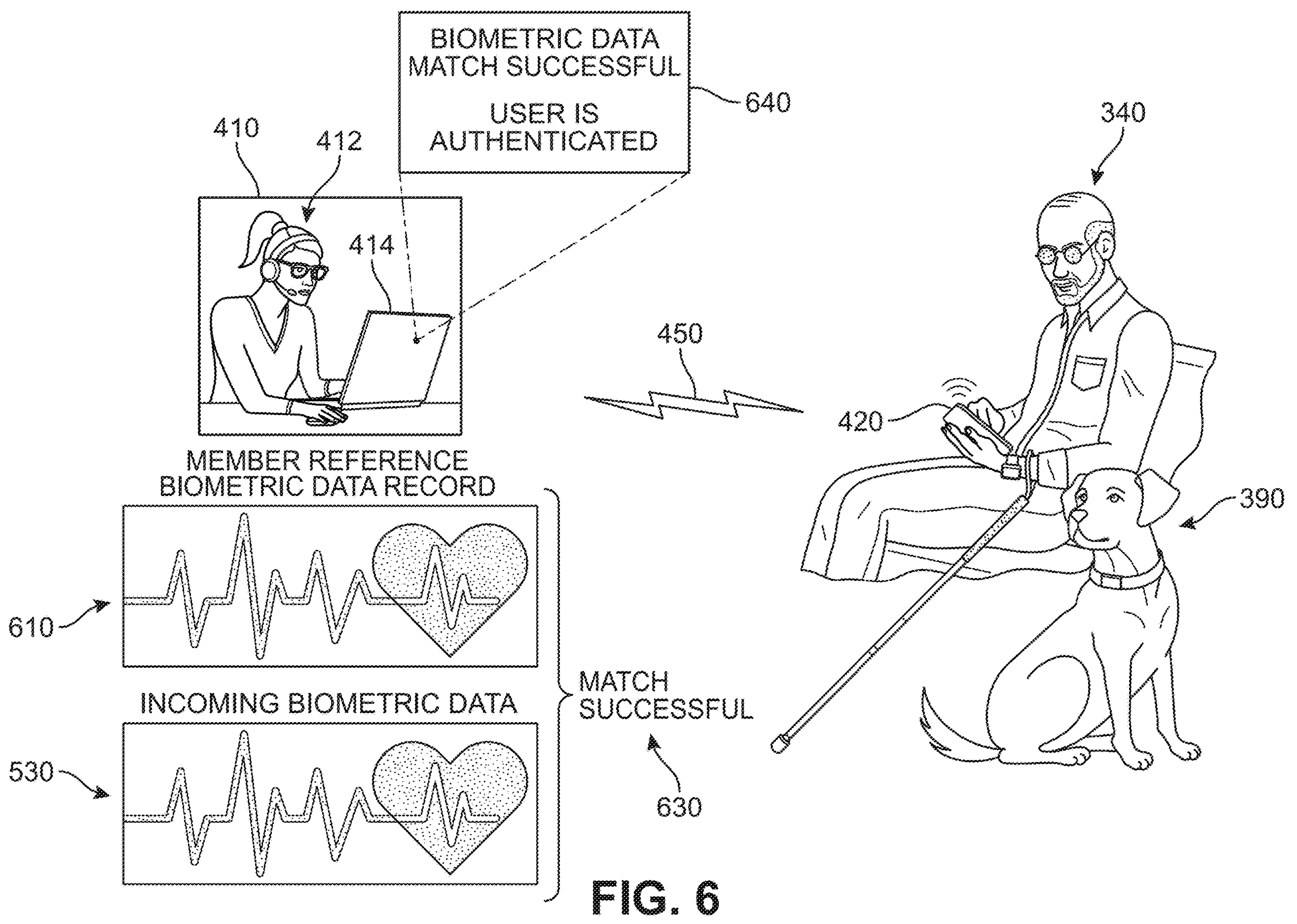

Referring now to FIGS. 4-6, an example of an authentication scenario occurring during a communication session 450 between the second user 340 and a second agent 412 is depicted. In FIG. 4, the second user 340 is, via a third computing device ("third device") 420 at a location 460, interacting with the access management authentication system and communicating with the second agent 412 over a network 450. The second user 340 is also sitting near (i.e., within signal detection range) to his guide dog 390 who wears a smart collar 394 around his neck which serves as the secondary device. The second agent 412 is communicating with second user 340 via a fourth computing device ("fourth device") 414 located at a remote site 410 such as a call center or other business.

For purposes of this example, the second user 340 has requested access to secured resources associated with a user account managed by the entity which agent 412 is representing. In this case, a first user interface ("first interface") 480 provides a first chat window 482 to allow the second user 340 to partake in an instant messaging session with the second agent 412 ("Authentication Request—MSR: Please ensure your service animal is near you and your device. /MSR: Ready?/YOU: Yes"). In other embodiments, the communication can occur in part or fully via a video conferencing interface whereby the second agent 412 and second user 340 speak in real-time over a video screen. Once the second user 340 provides his consent, a data collection event is automatically triggered by the system or initiated by the second agent 412.

Turning to FIG. 5, a schematic flow diagram depicts one example of the process by which a verification signal is obtained by the authentication system. In this example, a local instance of an authentication app 522 on the third device 420 can, on behalf of an authentication system 510, transmit a verification signal request 520 to the smart collar 394. In response, the smart collar 394 initiates a data collection session in which biometric data for the guide dog 390 is recorded in real-time using one or more sensors 504 embedded in the smart collar 394. This data can be processed via an onboard computing system 500. In some embodiments, a display for the onboard computing system 500 can present a status message 502 (e.g., "Detecting heartrate . . . transmitting biometric data to authentication app"). Biometric data or characterizations thereof can be transmitted to the authentication app 522 as a verification signal 530. The transmission can use any type of communication protocol 540 enabled by the communication module in the smart collar 394, such as Near-Field Communications (NFC), Wi-Fi, Bluetooth®, and cellular networks.

In different embodiments, after the authentication system receives the verification signal 530, the system can determine whether the features present in the signal are sufficiently similar. In FIG. 6, the verification signal 530 including a characterization of the dog's heartrate is evaluated in the context of a member reference biometric data record 610. The two patterns have been determined to be similar enough so as to be classified as a match, as indicated by a determination message 630 ("Match Successful"). A decision indication 640 can also be shown to the second agent 410 ("Biometric data match successful. User is authenticated.") via the fourth device 414. The system can then automatically enable or grant the second user 340 to access the secured resource, or the agent can respond to the verification by manually enabling access.

Figure 7:
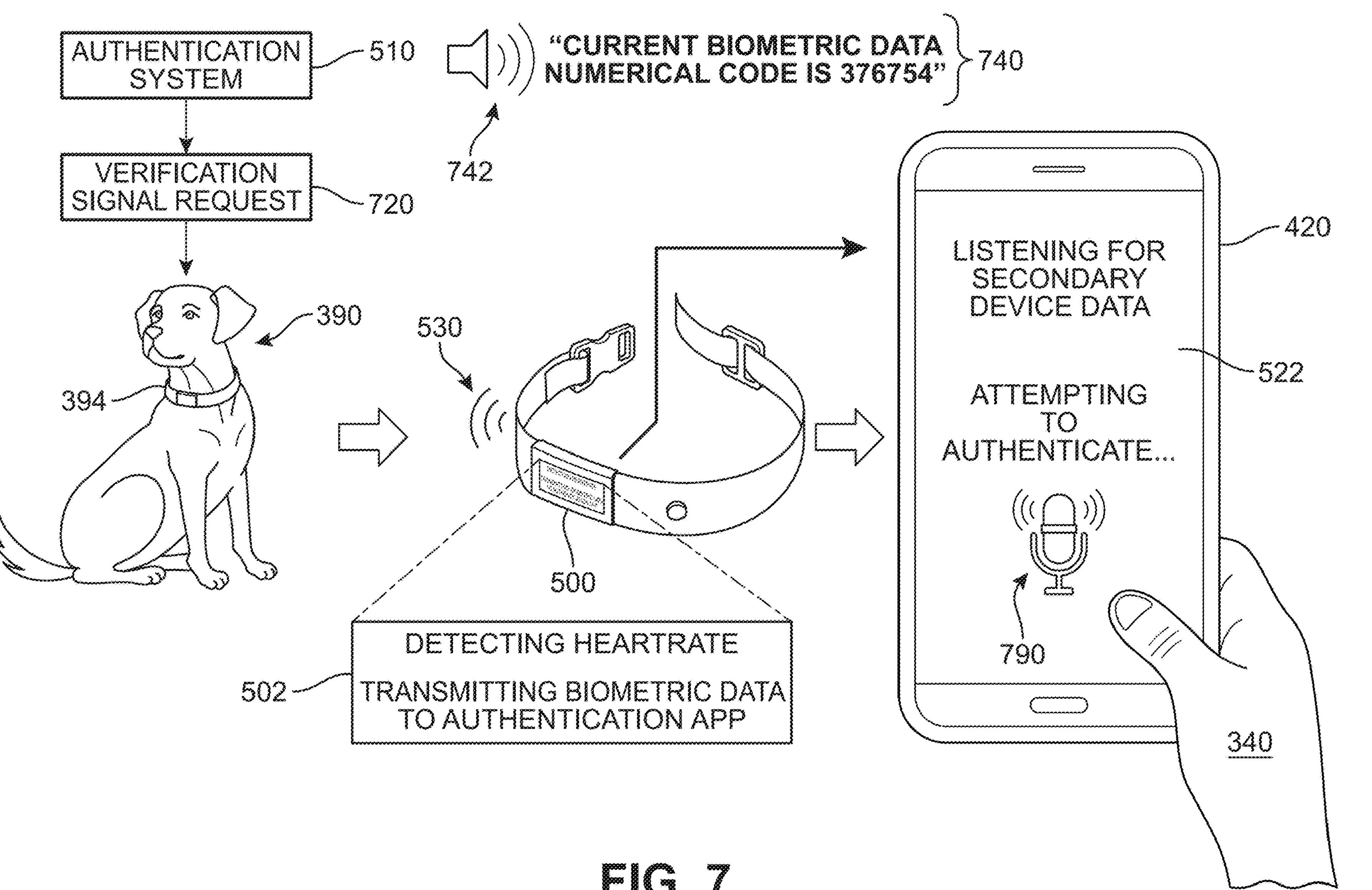
FIG. 7 depicts an alternate embodiment in which the secondary device converts the biometric data to a numerical code and also presents the code via an onboard speaker of the secondary device as an audio playback, according to an embodiment.
Figure 8:
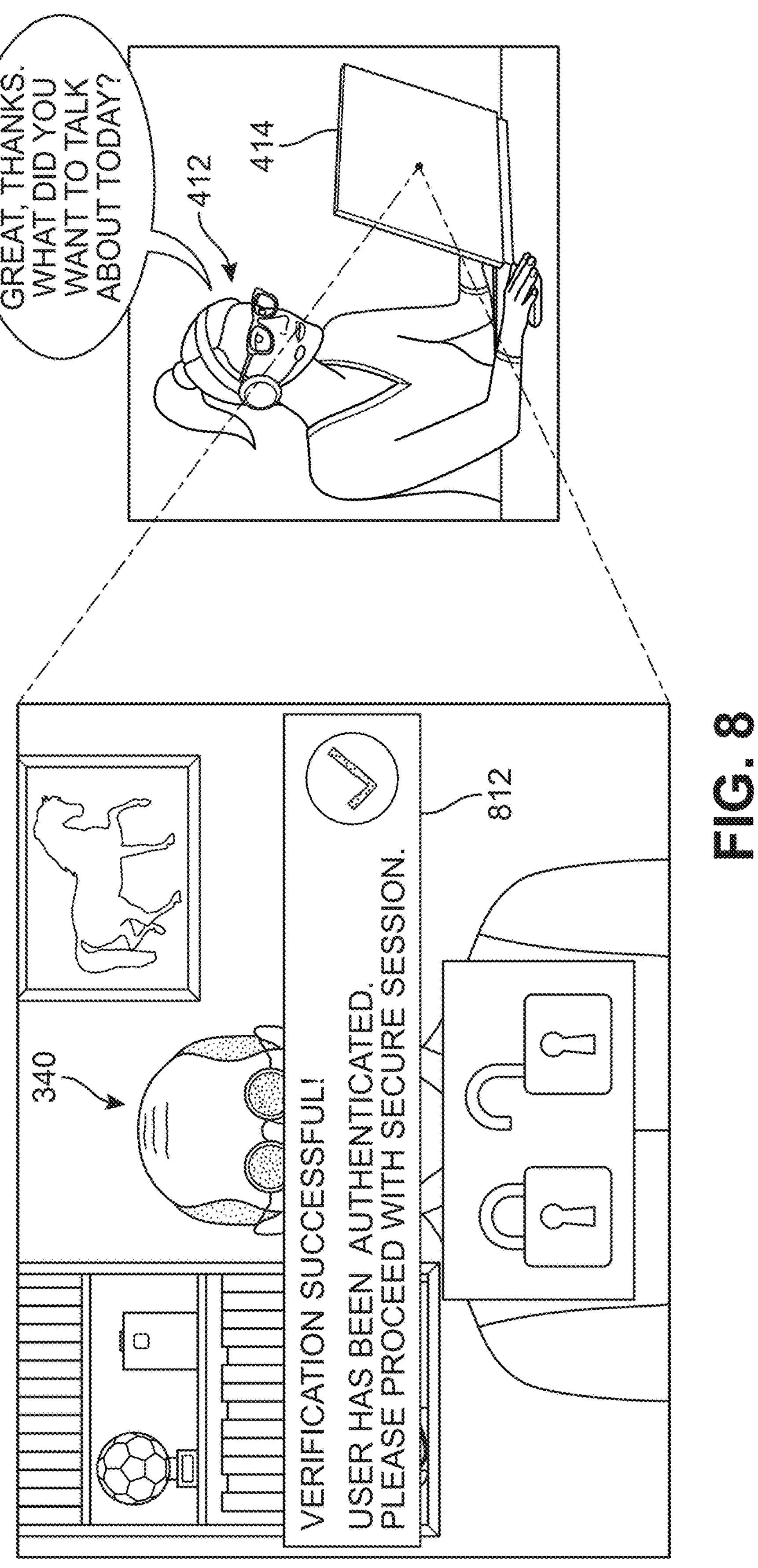
FIG. 8 illustrates an example of a system determination that the verification signal is authentic and thereby granting the user access to the secured resource, according to an embodiment.

Referring to FIG. 7, in some other embodiments, the smart collar 500 can also be configured to convey the requested information via an alternate mechanism. For example, in this schematic flow diagram, the authentication system 510 generates a different verification signal request 720 that causes the onboard computing system 500 to record the heartrate, but then further convert the biometric data that has been collected into a corresponding code that represents an equivalent to the biometric data. In some embodiments, this converted data can be transmitted in a verification signal described with respect to FIG. 5 to the authentication system. In another example, shown in FIG. 7, this biometric data translation 740 ("Current Biometric data numerical code is 376754") can instead be recited audibly (spoken language) via an onboard speaker 742 of the smart collar 394. In some embodiments, the code can be captured by a microphone 790 for the third device 420 and shared with the authentication system for assessment. In one example, the code need not be identical to the previously stored biometric data record and associated code. Instead, the code can be translated back to a representation of the type of biometric data that is stored in the database. This de-converted biometric data can then be compared with the reference record as described herein to determine whether access should be granted, as depicted in FIG. 8, where the second user 340 has been authenticated, as indicated by a confirmation message 812 ("Verification successful! User has been authenticated. Please proceed with secure session").

Figure 9:
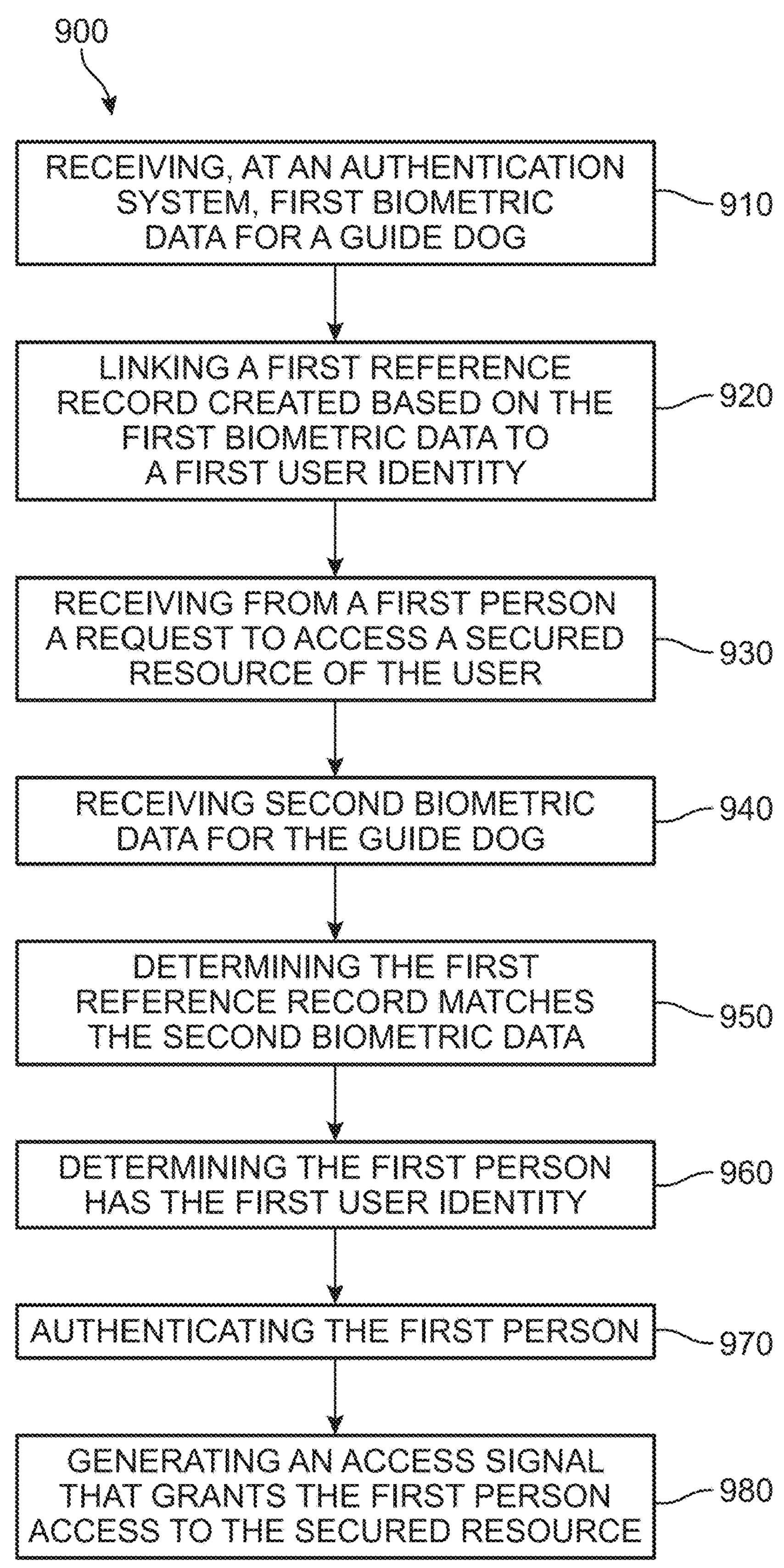
FIG. 9 is a flow chart depicting a process of verifying an identity of a user accompanied by a guide dog, according to an embodiment.

FIG. 9 is a flow chart illustrating an embodiment of a method 900 of verifying an identity of a user accompanied by a guide dog in order to protect user resources. The method 900 includes a first step 910 of receiving, at an authentication system, first biometric data for the guide dog. The authentication system may be a remote cloud-based server in some embodiments. The method 900 also includes a second step 920 of linking, at the authentication system, a first reference record created based on the first biometric data to a first user identity that is associated with the user. A third step 930 includes receiving from a first person, at the authentication system and via a first computing device, a request to access a secured resource of the user. Furthermore, a fourth step 940 includes receiving, at the authentication system, second biometric data for the guide dog obtained while the first person was physically within a first range of the guide dog. A fifth step 950 includes determining, at the authentication system, that the first reference record matches the second biometric data, and a sixth step 960 includes determining, at the authentication system, in response to the first reference record matching the second biometric data, that the first person has the first user identity. In addition, a seventh step 970 includes authenticating, in response to determining the first person has the first user identity, the first person, and an eighth step 980 includes generating, at the authentication system, an access signal that grants the first person access to the secured resource. In some embodiments, the access signal can trigger a release of a lock. In another example, a remote computing device can receive the access signal and in response cause the remote computing device to permit the first person to perform one or more actions, tasks, or operations that would otherwise be restricted or unavailable (prior to authentication).

In other embodiments, the method may include additional steps or aspects. In some embodiments, the guide dog is wearing a wearable secondary device including one of a smart device-enabled collar and a smart device-enabled harness, at the time the request to access the secured resource is received. In one example, the method also includes a step of transmitting, from the authentication system and to the wearable secondary device, a control signal including instructions to capture biometric data for the guide dog, thereby causing one or more sensors onboard the secondary device to record the guide dog's biometric data in real-time. in another example, the wearable secondary device includes a sensor that can detect one or more of the guide dog's heart rate, blood glucose, blood pressure, respiration rate, body temperature, blood volume, sound pressure, photoplethysmography, electroencephalogram, electrocardiogram, blood oxygen saturation, and skin conductance.

In some embodiments, the wearable secondary device transmits the second biometric data to the first computing device, and the first computing device then transmits the second biometric data to the authentication system. In one example, the request is received by the authentication system during a telephone or video-conferencing session between the first person and a service representative associated with the secured resource. In another example, the second biometric data serves as a second factor during a multi-factor authentication operation.

Other methods may be contemplated within the scope of the present disclosure. For example, in some embodiments, a method of verifying an identity of a user accompanied by a guide dog is disclosed. The method includes a first step of receiving from a first person, at the authentication system and via a first computing device, a request to access a secured resource associated with a first user identity. A second step includes receiving, at the authentication system, a verification signal from a secondary device worn by the guide dog, the verification signal obtained while the first person was physically within a first range of the guide dog. In addition, a third step includes determining, at the authentication system, that the verification signal is authentic, and a fourth step includes determining, at the authentication system, in response to the verification signal being authentic, that the first person has the first user identity. A fifth step includes authenticating, in response to determining the first person has the first user identity, the first person, and a sixth step includes generating, at the authentication system, an access signal that grants the first person access to the secured resource.

In such embodiments, the method may include additional steps or aspects. For example, in some embodiments, the guide dog is wearing a wearable secondary device including one of a smart device-enabled collar and a smart device-enabled harness, at the time the request to access the secured resource is received. In some embodiments, the method also includes a step of transmitting, from the authentication system and to the wearable secondary device, a control signal requesting that the wearable secondary device generate the verification signal. In one example, the wearable secondary device transmits the verification signal to the first computing device, and the first computing device then transmits the verification signal to the authentication system. In another embodiment, the request is received by the authentication system during a telephone or videoconferencing session between the first person and a service representative associated with the secured resource. In some embodiments, the second biometric data serves as a second factor during a multi-factor authentication operation. In one embodiment, the first image data is at least partially generated using deep fake technology. In some embodiments, the method can also include steps of generating a message indicating an unauthorized attempt to access the secured resource may have occurred when no verification signal is detected by the authentication system following a request, and automatically transmitting the message to a computing device associated with the first user identity.

Throughout this application, a user interface or "interface" may be understood to refer to a mechanism for communicating content through a client application (e.g., authentication app) to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments (not shown in the drawings), the interface can include a welcome or header message(s), and/or a plurality of data input fields can also be presented. Some non-limiting examples of such fields can include options directed to identification of the account owner and other users (e.g., name, phone number, address). In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an identity of a user accompanied by a guide dog, the method comprising:
- receiving, at an authentication system, first biometric data for the guide dog;
- linking, at the authentication system, a first reference record created based on the first biometric data to a first user identity that is associated with the user;
- receiving from a first person, at the authentication system and via a first computing device, a request to access a secured resource of the user;
- receiving, at the authentication system, second biometric data for the guide dog obtained while the first person was physically within a first range of the guide dog;
- determining, at the authentication system, that the first reference record matches the second biometric data;
- determining, at the authentication system, in response to the first reference record matching the second biometric data, that the first person has the first user identity;
- authenticating, in response to determining the first person has the first user identity, the first person; and
- generating, at the authentication system, an access signal that grants the first person access to the secured resource.

2. The method of claim 1, wherein the guide dog is wearing a wearable secondary device including one of a smart device-enabled collar and a smart device-enabled harness, at the time the request to access the secured resource is received.

3. The method of claim 2, further comprising transmitting, from the authentication system and to the wearable secondary device, a control signal including instructions to capture biometric data for the guide dog, thereby causing one or more sensors onboard the secondary device to record the guide dog's biometric data in real-time.

4. The method of claim 2, wherein the wearable secondary device includes a sensor that can detect one or more of the guide dog's heart rate, blood glucose, blood pressure, respiration rate, body temperature, blood volume, sound pressure, photoplethysmography, electroencephalogram, electrocardiogram, blood oxygen saturation, and skin conductance.

5. The method of claim 2, wherein the wearable secondary device transmits the second biometric data to the first computing device, and the first computing device then transmits the second biometric data to the authentication system.

6. The method of claim 1, wherein the request is received by the authentication system during a telephone or videoconferencing session between the first person and a service representative associated with the secured resource.

7. The method of claim 1, wherein the second biometric data serves as a second factor during a multi-factor authentication operation.

8. A computer-implemented method of verifying an identity of a user accompanied by a guide dog, the method comprising:
- receiving from a first person, at the authentication system and via a first computing device, a request to access a secured resource associated with a first user identity;
- receiving, at the authentication system, a verification signal from a secondary device worn by the guide dog, the verification signal obtained while the first person was physically within a first range of the guide dog;
- determining, at the authentication system, that the verification signal is authentic;
- determining, at the authentication system, in response to the verification signal being authentic, that the first person has the first user identity;
- authenticating, in response to determining the first person has the first user identity, the first person; and
- generating, at the authentication system, an access signal that grants the first person access to the secured resource.

9. The method of claim 8, wherein the guide dog is wearing a wearable secondary device including one of a smart device-enabled collar and a smart device-enabled harness, at the time the request to access the secured resource is received.

10. The method of claim 9, further comprising transmitting, from the authentication system and to the wearable secondary device, a control signal requesting that the wearable secondary device generate the verification signal.

11. The method of claim 9, wherein the wearable secondary device transmits the verification signal to the first computing device, and the first computing device then transmits the verification signal to the authentication system.

12. The method of claim 8, wherein the request is received by the authentication system during a telephone or videoconferencing session between the first person and a service representative associated with the secured resource.

13. The method of claim 8, further comprising transmitting a verification signal request to the secondary device that causes the secondary device to initiate a data collection session in which biometric data for the guide dog is recorded, the verification signal including the recorded biometric data for guide dog.

14. A system for verifying an identity of a user accompanied by a guide dog, the system comprising a processor and machine-readable media including instructions which, when executed by the processor, cause the processor to:
- receive, at an authentication system, first biometric data for the guide dog;
- link, at the authentication system, a first reference record created based on the first biometric data to a first user identity that is associated with the user;
- receive from a first person, at the authentication system and via a first computing device, a request to access a secured resource of the user;

receive, at the authentication system, second biometric data for the guide dog obtained while the first person was physically within a first range of the guide dog;

determine, at the authentication system, that the first reference record matches the second biometric data;

determine, at the authentication system, in response to the first reference record matching the second biometric data, that the first person has the first user identity;

authenticate, in response to determining the first person has the first user identity, the first person; and generate, at the authentication system, an access signal that grants the first person access to the secured resource.

15. The system of claim 14, wherein the guide dog is wearing a wearable secondary device including one of a smart device-enabled collar and a smart device-enabled harness, at the time the request to access the secured resource is received.

16. The system of claim 15, wherein the instructions further cause the processor to transmit, from the authentication system and to the wearable secondary device, a control signal including instructions to capture biometric data for the guide dog, thereby causing one or more sensors onboard the secondary device to record the guide dog's biometric data in real-time.

17. The system of claim 15, wherein the wearable secondary device includes a sensor that can detect one or more of the guide dog's heart rate, blood glucose, blood pressure, respiration rate, body temperature, blood volume, sound pressure, photoplethysmography, electroencephalogram, electrocardiogram, blood oxygen saturation, and skin conductance.

18. The system of claim 15, wherein the wearable secondary device transmits the second biometric data to the first computing device, and the first computing device then transmits the second biometric data to the authentication system.

19. The system of claim 14, wherein the request is received by the authentication system during a telephone or videoconferencing session between the first person and a service representative associated with the secured resource.

20. The system of claim 14, wherein the second biometric data serves as a second factor during a multi-factor authentication operation.

* * * * *